United States Patent [19]

Stich

[11] 3,713,104

[45] Jan. 23, 1973

[54] ELECTRONIC SCANPOINT MATRIX WITH SWITCH MONITORING

[75] Inventor: Frederick A. Stich, Milwaukee, Wis.

[73] Assignee: GTE Automatic Electric Laboratories Incorporated, Northlake, Ill.

[22] Filed: June 29, 1971

[21] Appl. No.: 158,009

[52] U.S. Cl. .........340/166 R, 179/175.2 C, 317/9 D, 340/256

[51] Int. Cl. ............................H02h 3/04, H04q 1/00

[58] Field of Search......340/166, 409, 214, 413, 213, 340/256; 179/18 GF, 18 AB, 175.2 C

[56] References Cited

UNITED STATES PATENTS 3,571,800 3/1971 Taylor ............................340/166 R 3,626,248 12/1971 Bartlett ..............................340/256

*Primary Examiner*—Donald J. Yusko

*Attorney*—Kurt Mullerheim, B. E. Franz, R. F. Van Epps and Theodore C. Jay, Jr.

[57] ABSTRACT

An electronic scanpoint matrix for supervision of the states of a plurality of signal lines includes an array of scanpoints arranged in rows and columns, each scanpoint including a pnp transistor coupled to a signal line to be supervised and having selected conduction properties related to the state of its associated signal line. A pulsed d.c. electrical signal is coupled to each row of scanpoints and the pulsed input is coupled to an output associated with each column of scanpoints when a given transistor scanpoint is in a non-conducting state.

8 Claims, 1 Drawing Figure

PATENTED JAN 23 1973 3,713,104
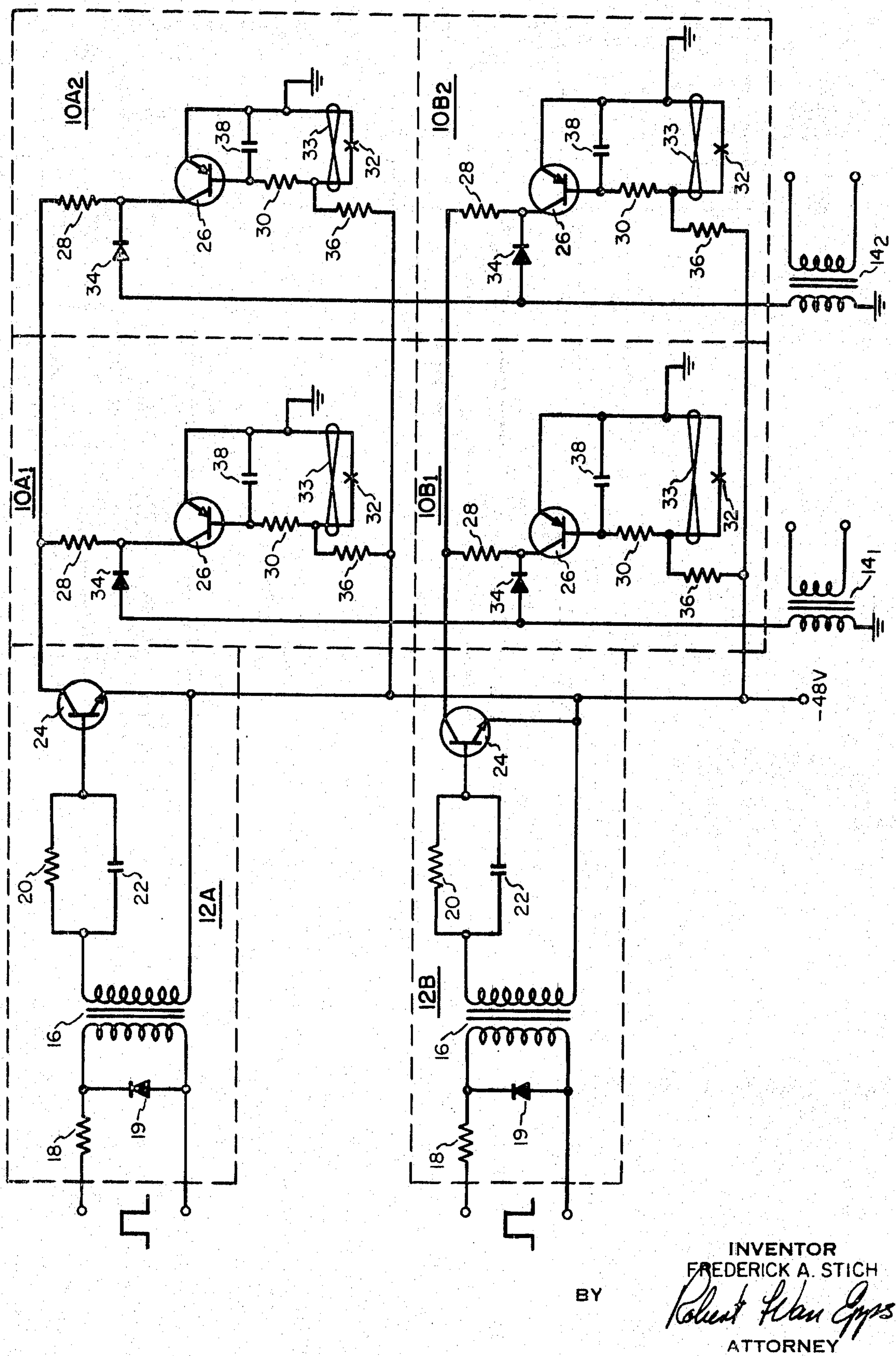
INVENTOR
FREDERICK A. STICH
BY Robert F. Van Epps
ATTORNEY

ELECTRONIC SCANPOINT MATRIX WITH SWITCH MONITORING

BACKGROUND OF THE INVENTION

1. Field of the Invention

The present invention relates generally to the field of electronic scanners and more particularly to an electronic scanpoint matrix for the supervision of the states of a plurality of signal lines.

2. Description of the Prior Art

In many applications it is desired to maintain electronic supervision of a plurality of signal lines. In the case of a telephone system, the scanning of individual subscribers' lines is conducted to detect changes in the condition of the lines and provide an indication of such changes to the exchange common units.

Prior to the present invention a variety of scanpoint matrices were developed including that described in U.S. Pat. No. 3,466,402 which issued on Sept. 9, 1969 to F. A. Risky and is assigned to the assignee of the present application. That patent describes apparatus for monitoring a predetermined range of current wherein the magnetic saturation of a core in the presence of a current flow of a preselected level operates to decouple a signal source from a detector circuit. Another type of electronic scanner is described in U.S. Pat. No. 3,558,828 which issued to P. R. L. Marty et al. on Jan. 26, 1971 wherein the scanpoints are saturable transformers.

Although these types of scanpoints are satisfactory in many applications, a disadvantage has become evident in using any wound magnetic component such as a core, transformer or relay for a mass-produced matrix element. It is clearly more simple to provide a limited number of electronic components on a printed wiring card than to produce magnetic components with accurate multiple windings. A further disadvantage arises in that in application to telephone systems the electrical contacts to be supervised may be separated from the matrix element by as much as one hundred feet of twisted pair cable upon which the magnetic element depends for pulse transmission. The propagation delays and impedance mismatching associated with this length of twisted pair cable has a degrading effect upon the logical one to logical zero signal level ratio.

The alternative to magnetic scanpoints has been the diode AND-gate which, although eliminating the magnetic components, dissipates excessive amounts of power when operated with the conventionally available −48 volt d.c. telephone office battery. For example a diode AND-gate applied as a scanpoint to produce a 5 volt pulse across a 100 ohm output termination continuously dissipates 1.25 watts of electrical power. Obviously, with the multiplicity of scanpoints involved in the telephone system application such a high power dissipation level is per se excessive as well as constituting a substantial heating problem.

OBJECTS AND SUMMARY OF THE INVENTION

From the foregoing it will be understood that among the various objectives of the present invention are the following:

to provide a new and novel electronic scanpoint matrix;

to provide apparatus of the above-described character which does not depend upon a cable between the scanpoint and the contact to be supervised for pulsed electrical signal transmission;

to provide apparatus of the above-described character which minimizes power dissipation while in an idle state; and to provide apparatus of the above-described character which has substantially no deleterious effect upon the supervised contact status signal ratio.

These among other objectives of the present invention are efficiently achieved by providing a plurality of scanpoints arranged in rows and columns and each including a pnp transistor having its emitter and base coupled with the individual contact to be supervised by that scanpoint. The collector lead is coupled in parallel with a scanpoint output diode to the input driver such that when the supervised contact is open the scanpoint transistor shunts the pulsed d.c. row driver output to ground. Conversely when the supervised contact is closed the scanpoint transistor is non-conducting and the pulsed d.c. signal is coupled through the output diode to a column output transformer. The pulsed d.c. input signal from the row driver thus is not required to traverse the often lengthy twisted pair cable to the supervised contact.

These and other objects, features and advantages of the present invention will become more apparent from the following detailed description taken in conjunction with the appended drawing.

BRIEF DESCRIPTION OF THE DRAWING

The sole appended FIGURE is a schematic diagram of an electronic scanpoint matrix in accordance with the principles of the present invention.

DESCRIPTION OF PREFERRED EMBODIMENT

With reference now to the drawing there is illustrated a 2 × 2 electronic scanpoint matrix wherein scanpoints 10A$_1$, 10A$_2$, 10B$_1$, and 10B$_2$ are arranged in rows and columns. Each row is coupled in parallel to a row driver 12A and 12B and each column is coupled in parallel to a column output transformer, 14$_1$ and 14$_2$. Each row driver 12, scanpoint 10, and output transformer 14 are respectively identical in structure and operation and the following description will thus be directed to row driver 12A, scanpoint 10A$_1$ and column output transformer 14$_1$.

In order to overcome the high power dissipation feature of prior scanpoint circuit it is necessary to apply electrical power to the scanpoint only at the time when it is desired to read-out the status of the line supervised by that scanpoint. To this end the row driver 12A is used not only as a means for row selection but also as a switch for selectively applying power to the row to be read out. Except for low level contact wetting current, no power is applied when information is not being read from the row of scanpoints. Isolation between the electronic logic circuitry and the d.c. input voltage is maintained by a pulse transformer 16 having a 1:1 primary to secondary turn ratio. A pulsed input from a scanner (not shown) is applied via resistor 18 across input diode 19 and the input leads of the pulse transformer 16. The resulting pulse in the secondary is coupled through an RC network comprising resistor 20 and capacitor 22 to the base of npn transistor 24. The other side of the transformer 16 secondary is coupled to the emitter lead of transistor 24 in parallel with the −V d.c. input to the matrix; e.g. in the telephone application of the invention, −48 volts. The RC network used in conjunction with the pulse transformer 16 operates to shape the base current of transistor 24 and thereby enhance its switching speed. The input pulse causes transistor 24 to switch to its conducting state and pass a d.c. pulse across the row of scanpoints $10A_1$ and $10A_2$.

The d.c. input pulse from row driver 12A is applied via resistor 28 to the collector of transistor 26 which has its base coupled through resistor 30 and the supervised contact 32 back to the emitter lead. For purposes of illustration the usual length of twisted pair cable running to the contact 32 is represented by the loop 33 about the schematic lead lines. Transistor 26 is in a conducting state when the supervised contact 32 is open and thus shunts the pulsed d.c. input from row driver 12A to ground. When the supervised contact 32 is closed, however, transistor 26 is non-conducting and the input pulse is passed through diode 34 to column output transformer $14_1$. Series resistors 30 and 36 determine the forward bias of transistor 26 and are split in order to provide relative immunity to the noise which is present on the twisted pair cable running from the scanpoint $10A_1$ to the supervised contact 32. Resistor 36 further establishes the contact wetting current. Capacitor 38 is inserted across the base and emitter leads of transistor 26 for the dual purpose of providing high frequency noise immunity and a charging path for the collector capacitance of transistor 26. In the absence of capacitor 38 the collector capacitance would charge through the base of transistor 26 thereby multiplying the collector capacitance by the common emitter current gain and produce severe rounding of the input pulse at the collector.

The foregoing description is based upon the presumption that the transistor elements of each scanpoint are capable of reliably handling the d.c. voltage levels which, in many applications, including telephone systems, are preselected. If it is desired to use lower voltage scanpoint transistors 26 it will be apparent that step-down transformers may be inserted between the collector of row driver transistors 24 and the parallel inputs of the scanpoints without degrading the performance of the present invention.

It has been found through tests performed by the Applicant that since the transistor scanpoint $10A_1$ does not rely upon the twisted pair cable running to the supervised contact 32 for pulse transmission, the zero (contact open) output of the apparatus of the FIGURE is insignificantly small whereas the one (contact closed) output remained substantially as sharp as the original input pulse even though the cable separating the contact and scanpoint was over one hundred feet in length. The present invention further has been found by the applicant to provide an improvement in manufacture in that a 32 bit row of scanpoints together with its associated row driver occupies a single 86-pin printed wiring card.

It will thus be seen that the Applicant has provided a new and improved electronic scanpoint matrix wherein the objectives set forth hereinabove are efficiently achieved. Since certain changes in the above-described construction will occur to those skilled in the art without departing from the scope of the invention it is intended that all matter included in the foregoing description or shown in the appended drawing shall be interpreted as illustrative and not in a limiting sense.

Having described what is new and novel and desired to secure by Letters Patent, what is claimed is:

1. An electronic scanpoint matrix for monitoring the states of a plurality of signal lines, each said line being provided with an electrical contact, said matrix comprising
   an array of scanpoints arranged in rows and columns, each said scanpoint being coupled across a corresponding signal line to be monitored, being electrically conductive in response to said remote contact being open and electrically non-conductive in response to said remote contact being closed;
   means associated with each said row of scanpoints for selectively coupling an electrical input signal in parallel to each scanpoint in a row of said array;
   output coupling means associated with each said column of scanpoints and coupled in parallel to each scanpoint in a column of said array;
   means for coupling said input signal to said output coupling means when any scanpoint in a column of said array is electrically non-conductive on the application of said input signal thereto; and
   means included in each said scanpoint for coupling said input signal to ground when said scanpoint is electrically conductive.

2. Apparatus as recited in claim 1 wherein each said scanpoint includes
   a junction coupled to said selective input coupling means;
   a source of biasing potential; and
   a pnp scanpoint transistor, having the collector thereof coupled to said junction, the emitter thereof coupled in parallel to one side of said line to be monitored and to said grounding means, and the base thereof coupled in parallel to the other side of said line to be monitored and to said source of biasing potential.

3. Apparatus as recited in claim 2 further including
   a capacitance coupled across the base and emitter of said transistor.

4. Apparatus as recited in claim 1 wherein
   said selective input coupling means includes a source of pulsed input control signals, a source of d.c. potential, and an npn transistor having the base thereof coupled to said control signal source, the emitter thereof coupled to said source of d.c. potential and the collector thereof coupled in parallel to each said scanpoint in a row of said array.

5. Apparatus as recited in claim 4 further including
   a resistance and a capacitance coupled in parallel between said source of input control signals and said transistor base.

6. Apparatus as recited in claim 2 wherein
   said source of biasing potential comprises a source of d.c. potential, and first and second series resistances through which said d.c. potential is coupled to the base of said scanpoint transistor.

7. Apparatus as recited in claim 2 wherein
   said output coupling means comprises a column output pulse transformer having the primary winding thereof coupled in parallel to the junction of each said scanpoint.

8. Apparatus as recited in claim 2 wherein said means for coupling said input signal to said output coupling means comprises a diode having the cathode thereof coupled to said unction and the anode thereof coupled to said output coupling means.

* * * * *